United States Patent Office 2,756,591

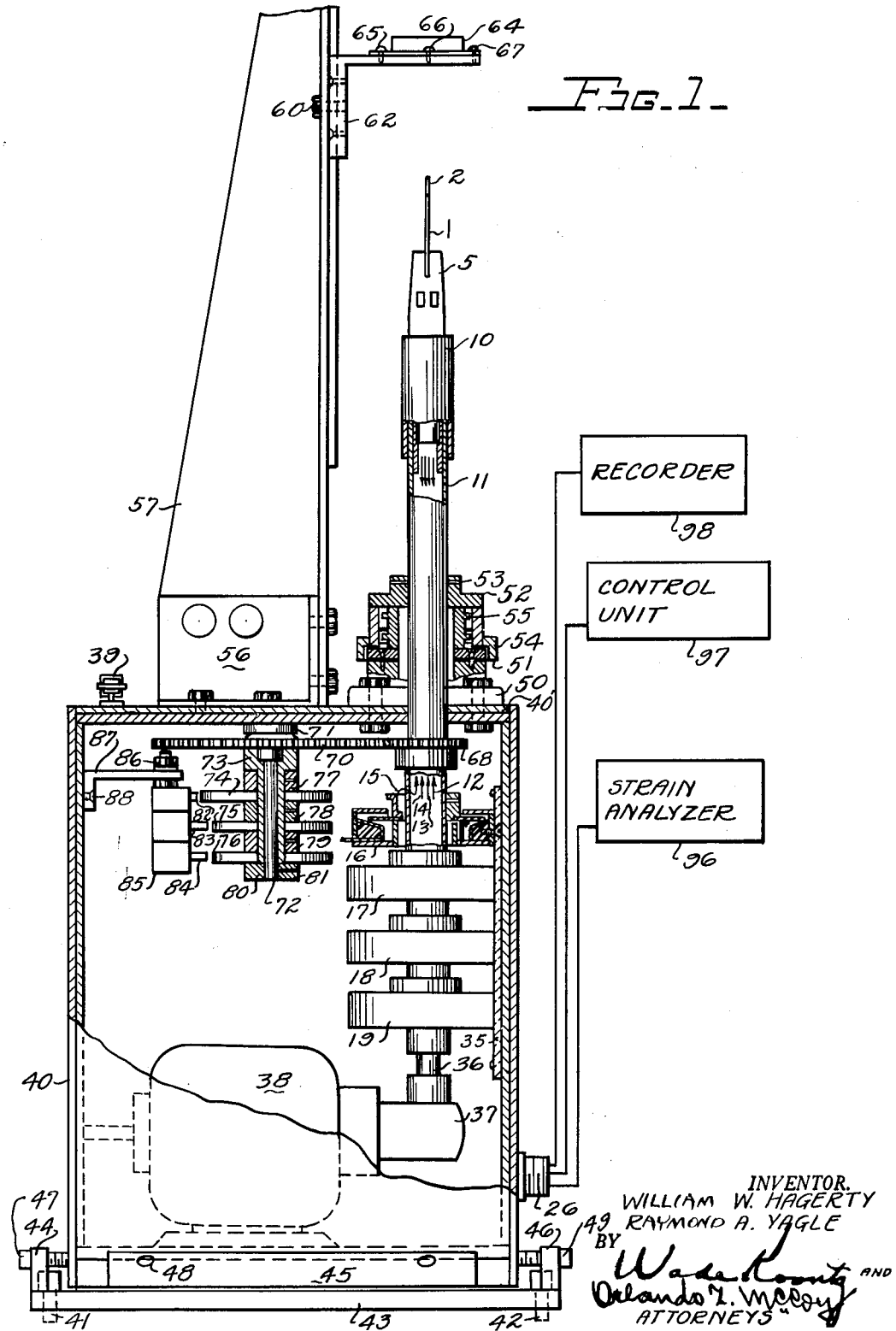

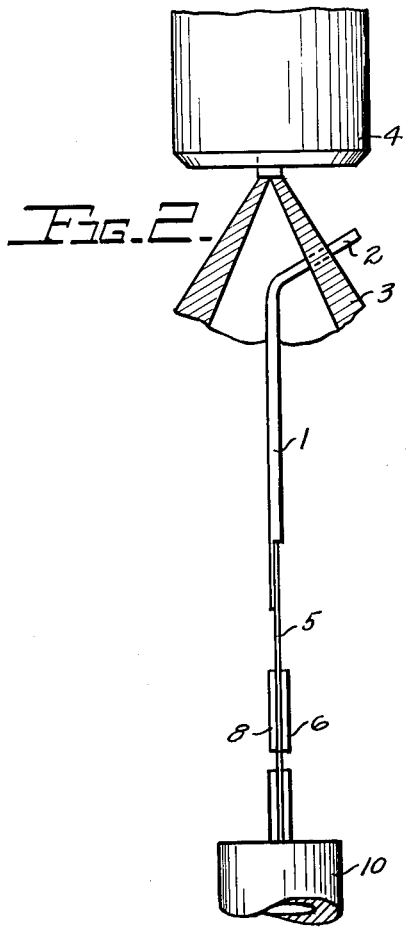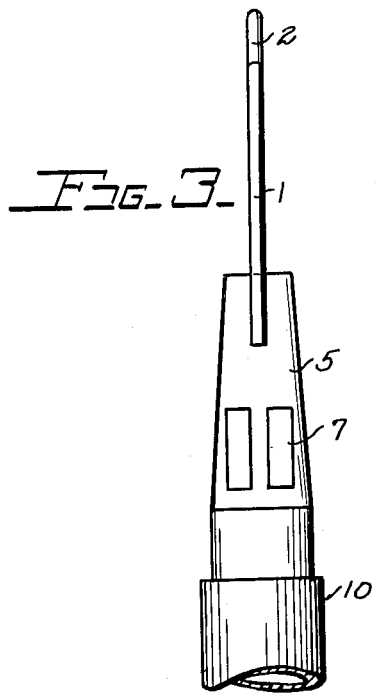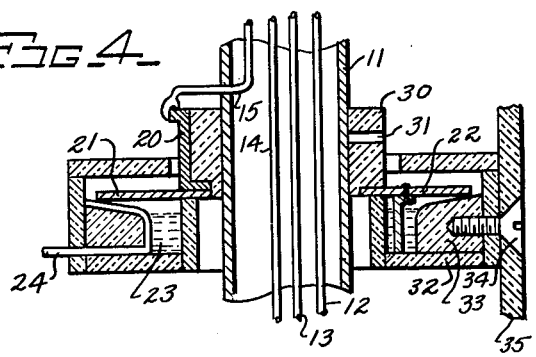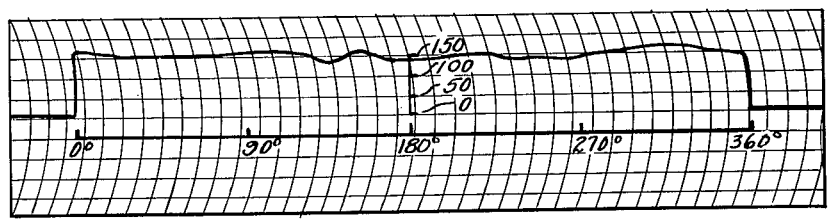

Patented July 31, 1956

2,756,591

SPRAY ANALYZER

William W. Hagerty and Raymond A. Yagle, Ann Arbor, Mich., assignors to the United States of America as represented by the Secretary of the Air Force Application August 20, 1953, Serial No. 375,581

18 Claims. (Cl. 73—119)

This invention relates to a rapid spray analyzer and more particularly to a spray analyzer that has a probe to be positioned in the spray and that provides a permanent record of the spray performance in the form of a chart reading mass distribution or momentum changes along the ordinate and angular displacement around the circle of a round or conical spray along the abscissa of the chart.

In the past study of continuous liquid sprays and their properties attempts have been made to determine an accurate spray pattern based on the numbers, sizes, quantities and velocities of droplets in air, such for example as fuel sprayed into an engine, or the like. Some analysis equipment provides a drop distribution pattern, some a flow pattern and some a pattern disclosing the quantitative disposition of the droplets in the spray. Additional work has been performed in attempts to determine the extent and the characteristics of the spray sheath and the spray angle as injected into an engine in order to improve the effectiveness and the control of combustion performance. Photography has been useful in arriving at conclusions concerning drop size and disposition, the flow pattern and the velocities of the liquid droplets in the spray. Samples withdrawn from various parts of the usual cone of the spray by cups, suction tubes projecting into the spray and similar devices have provided some information concerning quantitative localized spray content. These quantitative analysis methods that depend on the droplets impinging on a solid body that is designed to contain the liquid phase, increasingly discriminate against droplets of diminishing size.

The present invention depends on the droplets impinging on a solid body without the entrapment of the droplets and has evolved from a study of continuous fuel sprays. The principle of the present invention is based on rotation of a thin probe centered on the projected axis of the spray cone and rotating therein such that the droplets in the spray strike the probe in a direction that is substantially normal thereto.

An object of the present invention is to provide an improved instrument for recording liquid fuel disposition in a spray and an instrument that provides more exact data with greater convenience of operation than has characterized previously available devices of this type, that may be referred to generally as patternators.

Other objects of this invention are to provide an instrument that rapidly surveys a spray, that provides quantitative information on the mass distribution of the liquid dispersed medium in the spray in detail of angular distribution around the spray, and that provides some measure of the mean drop size in the spray with which the instrument is used.

A further object is that the use of the instrument provides comparative quantitative information on a plurality of nozzles, through which comparison a set of fuel passing nozzles may be matched accurately for all fuel pressures.

Another object is to provide an instrument that is adapted to be used at all angles between vertical and horizontal positions and that is sufficiently compact for its convenient use in combustion chambers of engines and the like to obtain spray information under actual airfuel flow conditions without interference in the normal air-fuel flow patterns in the engines actually using the mixture.

Other objects of the present invention are to provide permanent graphical spray performance records produced by a spray performance recording instrument that is convenient and easy to use and to maintain.

An illustrative embodiment of the present invention is shown in the accompanying drawings wherein:

Fig. 1 is an elevational view, partly broken away and in section, of a spray analyzing instrument that embodies the present invention, with associated commercially available devices indicated by block diagrams, by means of which are obtained performance graphs of nozzles with which the instrument is used;

Fig. 2 is an enlarged detailed diagrammatic view of the probe and strain gage bearing end of the device in Fig. 1;

Fig. 3 is the same as Fig. 2 rotated a quarter turn;

Fig. 4 is an enlarged section of a mercury cup connector in Fig. 1;

Fig. 6 is a graph produced by the operation of the equipment in Fig. 1.

Figure 5:
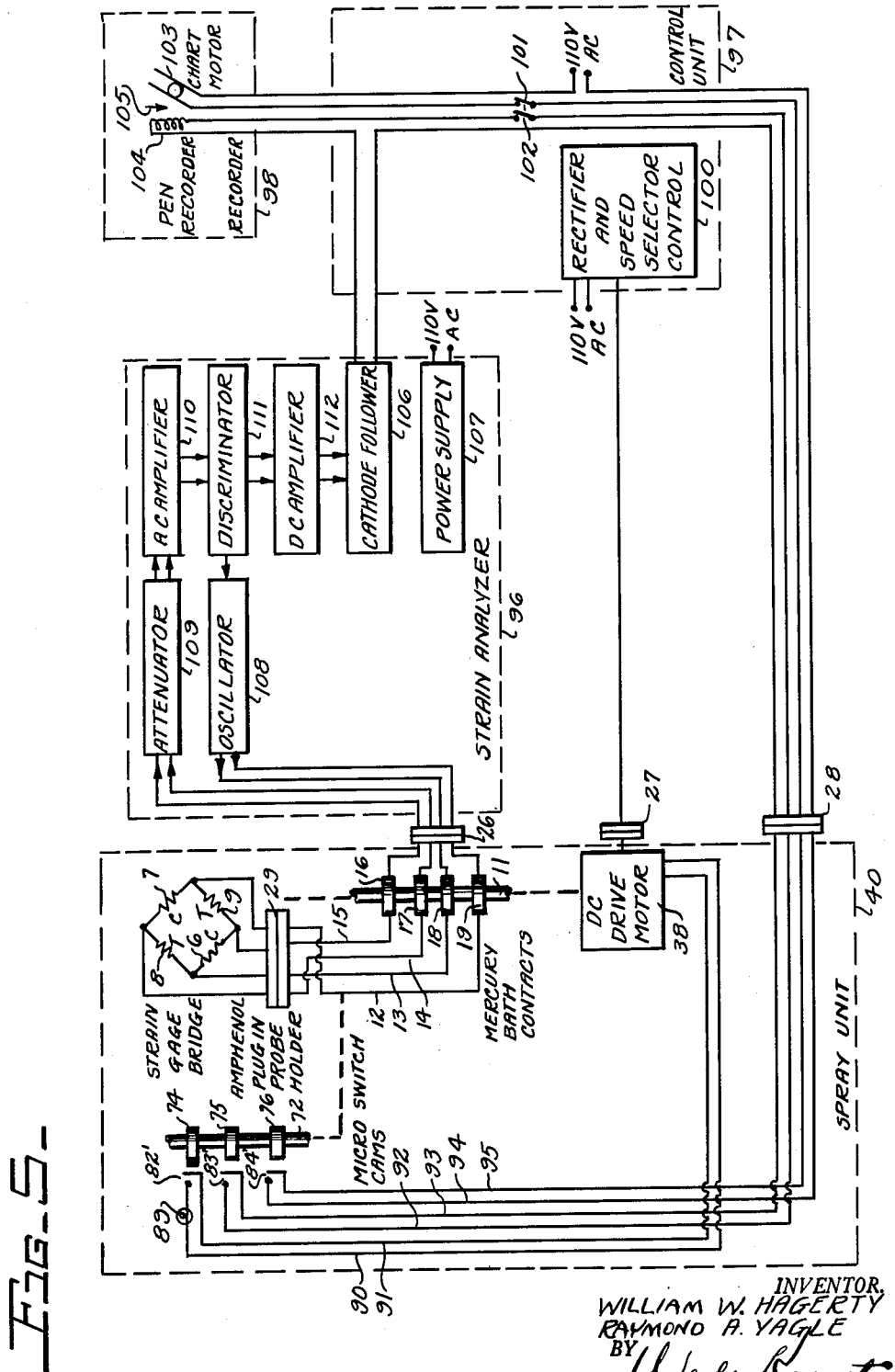
Fig. 5 is a simplified and abbreviated block diagram of the circuit of the equipment in Fig. 1.

In Fig. 1 of the accompanying drawings, a probe 1 that has its unattached end bent to provide a raked end or tip 2 such that, as the probe is rotated with the shaft of the probe 1 substantially in the axis of the cone of a spray 3 with which the device is to be used, the liquid drops in the conical spray that are emitted from an orifice in a nozzle 4 strike the raked probe end 2 from a direction that is substantially normal to the probe end 2. The probe 1 is attached at its lower end by welding or the like to the upper end of a flat cantilevered bar 5. The flat cantilevered bar 5 preferably has mounted thereon a pair of compression strain gages 6 and 7 on the side of the bar 5 that is subjected to compression forces from the impact of liquid spray particles against the probe raked end 2 and a pair of tension strain gages 8 and 9 attached to the opposite or tension side of the bar 5.

The strain gages 6 to 9, inclusive, are connected in a wheatstone bridge, as shown in Fig. 5 of the drawings, with the bridge outputs connected to a plug 29 not shown in Fig. 1 but indicated in Fig. 4, in a hollow cylindrical probe holder 10. The probe holder 10 essentially is a collar in the upper end of which the cantilever bar 5 is firmly secured, as in a slot in a block secured in the collar as by a press fit, threading or the like. The plug 29 is in the middle of the proble holder 10. The lower end of the hollow cylindrical probe holder 10 makes a press fit with, or is secured by threading or the like, to a cylindrical hollow shaft 11 that drives the probe in rotation within the cone of the spray 3 from the nozzle 4.

The remainder of the device comprises means for rotating the probe 1 and for providing and manipulating data from which is printed a graph indicative of the output from the gages 6 to 9, inclusive, as an indication of the flexing of the flat bar 5 in response to the relative mechanical energy applied to the probe raked end 2 by the liquid particles in the spray 3.

The shaft 11 is hollow and contains electrical leads 12 to 15, inclusive, that extend from the plug 29 connected with the strain gages 6 to 9, inclusive, to mercury cups 16 to 19, inclusive, that conduct rotating connectors to stationary connectors. The leads 12 to 15, inclusive, are attached separately to the mercury cups 16 to 19, inclusive, respectively.

The conduction of the output from the strain gages 6 to 9, inclusive, through the mercury cups 16 to 19, inclusive, respectively, is illustrated by the axially sectioned cup 16 in Fig. 1 and enlarged in Fig. 4. In this this sectional view, the lower end of the strain gage lead 15 is connected electrically, as by soldering or the like, through a copper lead-in contact 20 to a copper disc 21 then to a copper prong 22 that extends from the disc 21 down into mercury 23. From the mercury 23 electrical energy from the strain gage connected with the lead 15 passes through a copper lead-out 24 to a conducting wire lead, not shown, between the mercury 23 and a strain gage fitting 26 that, together with other fittings 27 and 28, is mounted on the side of the housing for the spray unit in Fig. 1, the corresponding circuit of which is shown in Fig. 5. The other mercury connectors have corresponding conducting wire leads to the strain gage fitting 26. The remaining structural parts of the mercury cup preferably are of an insulant that does not conduct electricity.

The moving parts of each mercury cup comprise essentially an insulant collar 30, the copper lead-in 20, the copper disc 21 and the prong 22. The moving parts of the mercury cup are secured to the rotating shaft 11 by a set screw 31 that threads through one side of the insulant collar 30. The immovable or fixed parts of the mercury cup comprise essentially an insulant cup 32 that contains, in addition to the mercury 23, a filler block 33 into which is threaded a set screw 34 by which the mercury cup is attached to an insulation plate 35 that is secured by screws or the like to the inner side wall of the spray unit housing 40.

The rotatable hollow shaft 11 continues downwardly to its junction with a solid shaft 36. The solid shaft 36 is driven through a pair of bevel gears in a gear box 37 by an electric motor 38 that illustratively is a commercially available Heller motor 6T6OX.

The spray unit assembly as a permanently mounted unit to which spray nozzles are to be brought for test preferably is maintained level, as indicated by a pair of levels, of which the level 39 shown is illustrative, disposed normal to each other on the spray unit housing top 40′, by corner supporting screws 41, 42, etc. threading downwardly through the spray unit housing base 43. The base 43 has end pieces 44, 45, 46, etc. extending upwardly therefrom with screws 47, 48, 49, etc. threading through the end pieces and contacting the lower end of the sides of the spray unit housing to permit the lateral adjustment of the spray unit housing on its base 43. Preferably two sides of the permanently mounted spray unit housing 40 are of heavy gage sheet metal to impart rigidity to the hollow structure and the other two sides are of thinner sheet metal removably secured to the heavier sides by screws so that they may be removed for easy access to the structures within the housing.

The spray unit housing has a top 40′ that supports and has bolted thereto a journal for the hollow shaft 11. The journal for the hollow shaft 11 comprises a base 50 to the top of which is attached by screws, as shown, a base shaft seal 51 so that these parts are firmly secured to the spray unit housing. Above the journal assembly is a shaft seal assembly that rotates with the shaft 11 and that comprises a top shaft seal 52 that is secured by a set screw 53 to the shaft 11. The top shaft seal 52 is essentially bell shaped and terminates downwardly in an outwardly extending lip 54 and houses a rotating gasket 55 between it and the shaft 11.

The permanently mounted spray unit housing top 40′ also has bolted thereto the base 56 of a bracket nozzle holder 57 that essentially is of T section. The bracket nozzle holder 57 has a pair of slots extending longitudinally of its face with a bolt 60 in each slot and threading into an L-shaped nozzle bracket 62 for vertical adjustment. The nozzle bracket 62 has a shelf portion 63 extending away from the nozzle bracket holder 57. The nozzle bracket shelf portion 63 supports thereon a nozzle adapter 64 that contains a circular aperture for the disposition of the nozzle 4 therein. The nozzle adapter 64 is secured to the nozzle bracket shelf 63 by bolts 65, 66, 67, etc. The bracket nozzle holder 57 and assembly may be dispensed with in a mobile type of device that functions between horizontal and vertical positions, within the scope of the present invention.

The operation of the motor 38 in driving the shaft 11 also operates a cam activated microswitch assembly within the spray unit housing by the engagement between a gear 68 that is secured by a set screw to the hollow shaft 11 and a cam gear 70. The cam gear 70 is journalled by suspension from a socket 71 attached to the top 40′ of the spray unit housing and turns a cam shaft 72.

A cam shaft sleeve 73 that has an expanded upper end positioned against the underside of the cam gear 70 provides a mounting core for a plurality of cams 74, 75 and 76 with cam spacers 77, 78 and 79, respectively, therebetween. The cam assembly is secured together from below by a collar 80 that is secured to the camshaft 72 by a set screw 81. Each cam 74, 75 and 76 engages a cam rider 82, 83 and 84, respectively, that actuates a microswitch indicated in Fig. 5 by its cam rider reference numeral primed in a microswitch housing 85. The assembly is available commercially as a snap action switch hinged arm roller type. The microswitch housing 85 is supported by a bolt 86 from one end of an L-shaped microswitch holder 87, the other end of which is attached by a screw 88 to an inner side wall of the spray unit housing 40. One pair of cam leads 90 and 91 connect the microswitch 82′ to the motor 38. The other two pairs of cam leads 92 and 93, 94 and 95 connect the microswitches 83′ and 84′ to the amphenol fitting 28 mounted on the side of the spray unit housing 40. A light 89 is energized when the motor 38 is in operation.

In the use of the spray unit for the providing of a chart indicating mass distribution or momentum changes along the ordinate and angular displacement along the abscissa, as shown in Fig. 6 of the drawings, the spray unit fittings 26, 27 and 28, respectively, are connected as shown with commercially available equipment indicated in blocks in Fig. 1.

In Fig. 5 of the accompanying drawings is shown adequate circuitry for an understanding of the present device in its association with commercially available equipment.

The spray unit housing 40 has mounted thereon the three electrical connection fittings 26, 27 and 28 that connect respectively the output from the strain gages 6–9 inclusive, the probe rotating motor 38, and the recorder synchronizing microswitches 83′ and 84′ with the commercially available equipment.

The strain gage fitting 26 applies output from the strain gages 6–9 inclusive, to a strain analyzer 96. The probe rotating motor fitting 27 is connected with a control unit 97. The recorder synchronizing microswitch fitting 28 is connected through the control unit 97 to both a recorder 98 and to the strain analyzer 96.

The probe motor 38 within the spray unit housing 40 is connected in parallel across the power from a rectifier and speed selector control 100 in the control unit 97 with the light 89 on the leads from the microswitch 82′ to the probe motor 38 that also is within the spray unit 40. The two recorder synchronizing microswitches 83′ and 84′ are connected through the control unit 97 and its ganged switches 101 and 102 to the recorder 98 and the microswitch 83′ also is connected to the strain analyzer 96. The switch 101 closes the circuit to the chart motor 103. The switch 102 closes the circuit to a recorder winding 104 that actuates a recorder pen 105 and also to a cathode follower 106 that supplies output from the strain analyzer 96. The light 89 indicates synchronization between the probe operating hollow shaft 11 and the chart motor 103.

The strain analyzer 96 derives power from a power supply 107. The strain analyzer 96 supplies a frequency from an oscillator 108 to the pair of alternating current terminals of the strain gage bridge 6 to 9, inclusive, and derives a direct current input applied to its attenuator 109 from the direct current terminals of the bridge. Output from the attenuator 109 is amplified in an alternating current amplifier 110, converted to direct current in a discriminator 111 that passes its output to both the oscillator 108 and through a direct current amplifier 112 to the cathode follower 106 that provides output from the strain analyzer 96.

This circuitry maintains in synchronization a position of the recorder inking pen 105 with respect to the angular displacement of the probe raked tip 2 in the cone of the spray 3 or all positions of the spray probe between the horizontal and vertical within the scope of the present invention that is of particular advantage in working on internal combustion motors.

The graph in Fig. 5 shows fluctuations that record momentum changes and hence changes in mass distribution around the circumference of the spray. For a fixed pressure drop across the nozzle these changes may indicate variations in discharge rate, peripheral velocity, sheath thickness and cone angle of the spray.

It is to be understood that the assembly and the parts thereof that are shown and described herein have been submitted as an operative embodiment of the present invention and that similarly functioning modifications and substitutions of parts therein may be made without departing from the scope of the present invention.

What we claim is:

1. A rapid spray analyzer, comprising a probe with a raked end to be introduced into a spray of droplets moving normally to the axis of the raked end of the probe, a flat cantilevered bar to which an end of said probe is attached and the bar being deflectible in a plane common with the plane of the probe raked end, a plurality of strain gages on said bar and producing an electrical signal output of an amplitude proportional to the degree of bending of the bar under the impact of spray droplets against the probe raked end, and means for rotating said bar and probe whereby the output from the strain gages indicates characteristics of the spray in which the probe raked end is positioned.

2. The rapid spray analyzer defined in the above claim 1 adapted for use with the axis of the probe between horizontal and vertical positions, inclusive of a mercury cup connector through which strain gage electrical signal output of the spray analyzer assembly is conducted.

3. A rapid spray analyzer, comprising a probe with a raked end, shaft means for rotating the probe, a flat cantilevered bar between the probe and the shaft means and deflectible in the plane of the probe raked end and a compression strain gage on one said of said bar over which the probe raked end extends and emitting an electrical compression signal output on the deflection of the bar, a tension strain gage on the side of said bar opposite from the side on which the compression strain gage is positioned and emitting an electrical tension signal output on the deflection of the bar, means rotating the probe through the bar and shaft means, and means synchronizing strain gage output with degree of rotation of said probe.

4. A rapid spray analyzer, comprising a probe with a raked end making an angle with the probe axis, a cantilevered bar secured to the unraked end of the probe, a strain gage on said bar and emitting an electrical signal output on the flexing of the bar, a shaft rotating said probe through said bar, a motor rotating said shaft, a plurality of sequence indicating microswitches actuated from the shaft rotated by said motor and instrumental in maintaining synchronization between the angular displacement of the probe and the electrical signal output of the strain gage.

5. The spray analyzer defined in claim 4 inclusive of a mercury cup connector tiltable between horizontal and vertical positions passing the electrical signal output from the strain gage.

6. A spray analyzer, comprising a spray unit, within the spray unit a probe with a raked tip for exposure to moving particles of matter, a contilever bar supporting the probe from one end of the bar, strain gage means on the bar and sensitive by variations in electrical signal output to flexures of the bar, shaft means rotating the bar and the probe, motor means rotating the probe through the shaft and the bar, electrically conductive mercury cup connector means receiving an electrical signal output from said strain gage, cam means operated from the shaft by the motor, microswitch means operated by the cam means and providing a spray unit synchronizing microswitch electrical output signal; a strain analyzer circuit deriving its input through the mercury cup connector means from the strain gage and having an output indicative of the magnitude of strain to which the bar is subjected from the impact of moving particles of matter on the probe raked tip; a control unit receiving its electrical signal input from the microswitch output signal and having an electrical signal control output, speed selector control means in the control unit controlling the operation of the spray unit motor, a recorder means deriving its electrical signal input from both the strain analyzer circuit and from the control unit and providing a continuous permanent record of the magnitude of the spray unit impact force of the particles of matter on the probe raked tip throughout the probe rotational angular displacement.

7. The spray analyzer defined in claim 6 wherein the strain gage means on the bar comprises a four element strain gage bridge having a direct current terminal and an alternating current terminal, and the mercury cup connector means comprising four mercury cup connectors connecting the four element strain gage bridge with the strain analyzer circuit.

8. The spray analyzer defined in claim 7 wherein the strain analyzer comprises an oscillator supplying a signal frequency through two of the mercury cup connectors to the strain gage bridge, an attenuator receiving strain gage signal output through two of the mercury cup connectors, an alternating current amplifier receiving its input from the attenuator and having an output, a discriminator deriving its input from the alternating current amplifier and passing one output to the oscillator and having a second output, a direct current amplifier deriving its input from the discriminator second output and itself having an output, a power supply, and a cathode follower circuit deriving its input from the direct current amplifier and passing its output through the control unit to the recorder.

9. A rapid spray analyzer, comprising a substantially completely rotatable probe with an inclined tip portion for insertion into the spray with the probe tip portion extending substantially normal to the spray flow direction for receiving impact forces therefrom throughout the spray circumference, means for rotating the probe in the spray, means detecting the force exerted by the spray on the probe tip portion, and means recording the force so detected in stages of the degree of rotation of the probe.

10. A spray analyzer, comprising a continuously rotatable probe with a shaft portion which is positionable substantially coaxial with to rotate within the spray, a probe tip portion extending laterally from the probe shaft portion sufficiently to translate force thereto upon the probe tip portion being impacted by the spray, means for rotating the probe in the spray and means receiving its input from the probe shaft portion and functioning in detecting the relative magnitudes along the spray periphery of the spray force delivered to the probe tip portion.

11. The spray analyzer defined in the above claim 10 inclusive of means for recording the detected spray force.

12. The spray analyzer defined by the above claim 10 wherein the spray force on the probe tip portion is detected for predetermined rotational probe positions.

13. The spray analyzer defined by the above claim 10 wherein the spray force detecting means is a plurality of strain gages mounted on a cantilevered bar part of the probe subjected to bending forces of magnitudes determined by the forces delivered by the spray to the probe tip portion at its respective successive positions along the periphery of the spray outwardly from the axis thereof.

14. The spray analyzer defined by the above claim 13 wherein output leads from the strain gages conduct electrical energy therefrom and as an intermediary in the spray analyzer energy transfer for the ultimate purpose of determining the spray force magnitude and the spray force location in the spray pattern imparted from the spray to the probe tip portion.

15. The spray analyzer defined by the above claim 14 wherein mercury cup connectors conduct electrical output from the moving strain gage output leads to stationary fittings available therefor.

16. The spray analyzer defined in the above claim 15 inclusive of a strain analyzer connectable through one of said fittings and the mercury cup connectors to the strain gages on the cantilever bar in one direction and in the opposite direction to means for analyzing in terms of magnitude and locations in the spray pattern the force transfer from the spray to the probe tip portion as the probe tip portion changes its position within the spray.

17. A spray analyzer, comprising a continuously movable probe tip portion extending from a probe shaft portion which is positionable substantially coaxial with the spray, means rotating the probe shaft portion and thereby moving the probe tip portion through the spray flow to receive impact forces therefrom and to translate the received forces to the probe shaft, deflectable means receiving probe tip forces from the probe shaft, electro sensitive means attached to the deflectable means and providing electric signal indicating in amplitude and in time the magnitude and the occurrence of the probe tip movement by the impact of the spray thereagainst, recording means receiving its input as the electric signal from the electro sensitive means as being responsive to the magnitude of the spray action on the probe in its various angular positions, and a plurality of switch operating cam arrangements actuated by the probe rotating means and maintaining the recording means in synchronization with the probe rotary position.

18. A spray analyzer, comprising a continuously rotating probe substantially coaxial with the spray, a raked tip probe end extending from the spray axis radially outwardly thereof and inclined thereto at an angle substantially normal to the direction of travel of the particles of the spray, means connected to said probe for detecting the force exerted by the spray particles upon the probe raked tip, and means actuated by the force detecting means for recording the detected force selectively in a plurality of stages of probe rotation.

References Cited in the file of this patent

UNITED STATES PATENTS

| | | |
|---|---|---|
| 1,288,363 | Young | Dec. 17, 1918 |
| 1,667,660 | Gehm | Apr. 24, 1928 |
| 1,962,174 | Christman | June 12, 1934 |
| 2,483,637 | Hawthorne et al. | Oct. 4, 1949 |